J. W. MARKHAM.
STEERING WHEEL.
APPLICATION FILED OCT. 13, 1916.

1,255,199.

Patented Feb. 5, 1918.

Witnesses

J. W. Markham, Inventor by

Attorne

UNITED STATES PATENT OFFICE.

JAMES WILLIAM MARKHAM, OF ARMSTRONG, INDIANA.

STEERING-WHEEL.

1,255,199.　　　　　Specification of Letters Patent.　　Patented Feb. 5, 1918.

Application filed October 13, 1916. Serial No. 125,440.

*To all whom it may concern:*

Be it known that I, JAMES W. MARKHAM, a citizen of the United States, residing at Armstrong, in the county of Vanderburg and State of Indiana, have invented new and useful Steering-Wheels, of which the following is a specification.

The present invention appertains generally to locks, and aims to provide a novel and improved locking device for the steering wheel of an automobile, whereby to prevent the steering of the automobile through the medium of the hand wheel when the lock is properly operated, and thereby frustrate any attempt by an unwarranted or maliciously inclined person stealing the machine.

It is also the object of the invention to provide a locking device assembled with the steering wheel and column whereby the wheel can be released from the steering shaft when the car is vacated, in order that the shaft cannot be rotated by means of the wheel, since the wheel when turned will simply rotate loosely.

A further object of the invention is to provide a locking device of the nature indicated which is extremely simple and inexpensive in construction, which can be readily applied to various steering wheels and columns without entailing prohibitive trouble or expense, and which is thoroughly practical and efficient in use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1:
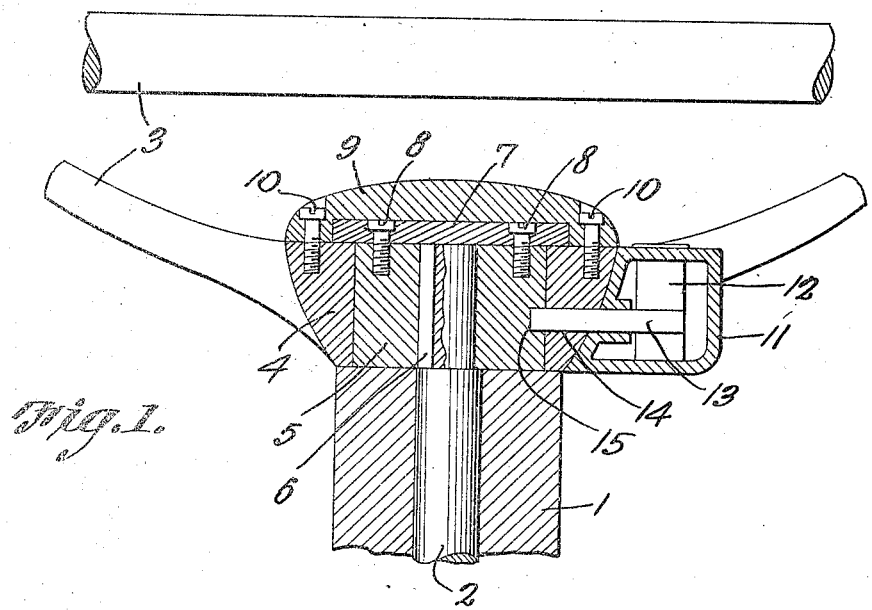
Figure 1 is a median section of the device as applied.
Figure 2:
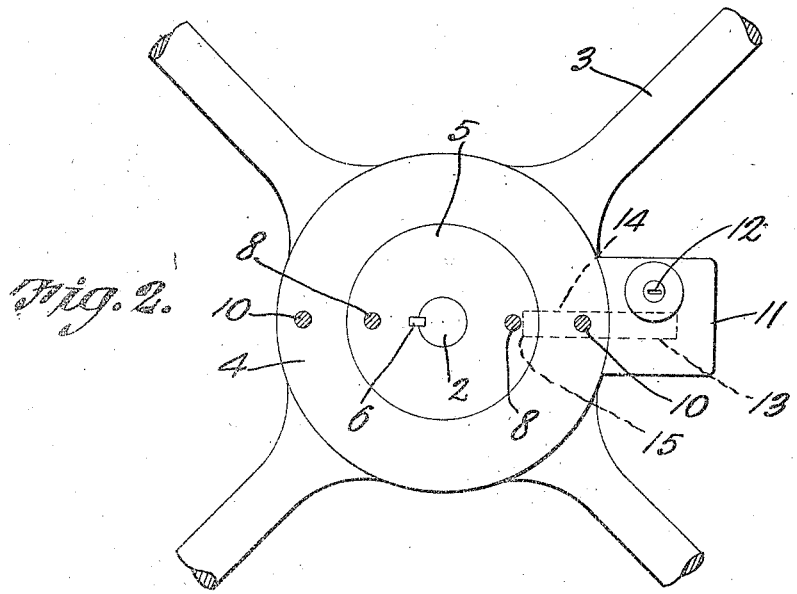
Fig. 2 is a plan view thereof with the hub cap and retaining disk removed.

In the drawing, there is illustrated the upper end of the steering column including the casing 1 and steering shaft 2, with the upper protruding end of which the steering wheel 3 is assembled through the medium of the present device.

In carrying out the invention, there is fitted within the hub 4 of the wheel 3, a bushing 5 which is flush with the faces of the hub 4 and which fits loosely within the hub so that the bushing and wheel can rotate relatively under certain conditions. The bushing 5 is fitted upon the upper terminal of the shaft 2 and is fastened thereto by means of a key 6 or other suitable device for that purpose. A retaining disk 7 seats upon the upper end or face of the bushing 5 and its margin overlaps the upper face of the hub 4, the disk 7 being secured to the bushing 5 by means of screws 8 or other securing elements, whereby the bushing 5 being secured to the shaft 2 will hold the hub 4 upon the bushing, since the disk 7 will resist the removal of the hub 4 from the bushing.

A hub cap 9 is fitted over the disk 7 and incloses the same, and the rim of the cap 9 is secured upon the hub 4 by means of screws 10 or other securing elements, and the cap 9 incloses the underlying parts.

Secured to the periphery of the hub 4 is a suitable key controlled lock including a casing 11 fastened to the hub, and a key barrel 12 for receiving a proper key to operate the lock bolt 13 which projects from the casing 11 and slides through an aperture 14 in the hub 4 to enter a keeper recess 15 in the bushing 5. When the bolt 13 is projected into the recess 15, the hub 4 is locked to the bushing 5 and shaft 2, so that the shaft 2 can be rotated by means of the hand wheel 3. When the bolt 13 is retracted, the hand wheel is released from the shaft 2, and will simply rotate idly without rotating the shaft 2, so that it is necessary to employ the proper key for moving the lock bolt 13 into the recess 15 before the machine can again be steered. This serves to thwart the running of the car by a person not possessing the requisite key.

Having thus described the invention, what is claimed as new is:

A vehicle steering device embodying a steering column having a casing and a steering shaft therein having its upper end projecting therefrom, a bushing secured on said end of the shaft at the upper end of said casing, a retaining disk bearing against the bushing and having its edge portion projecting therefrom, securing means extending through the disk and engaging the bushing, a hand wheel having a hub rotatable upon the bushing and held between the upper end of said casing and edge portion of said disk, a cap fitting over said disk, securing means extending through the cap and engaging the hub, and means for connecting said hub and bushing.

In testimony that I claim the foregoing as my own, I have hereto affixed my signature in the presence of two witnesses.

JAMES WILLIAM MARKHAM.

Witnesses:
EDWIN A. ANGERMEIER,
CHAS. KRIETEMEYER.